United States Patent Office 3,475,380
Patented Oct. 28, 1969

3,475,380
GROUP I-A METAL MANGANITES, MANGANATES, AND COBALTITES AS POLYESTER POLYCONDENSATION CATALYSTS
John A. Price, Swarthmore, and Otto K. Carlson, Marcus Hook, Pa., assignors to FMC Corporation, Philadelphia, Pa., a corporation of Delaware
No Drawing. Filed Feb. 3, 1967, Ser. No. 613,757
Int. Cl. C08g 17/015
U.S. Cl. 260—75          5 Claims

ABSTRACT OF THE DISCLOSURE

Process of preparing polyethylene terephthalate resin comprising carrying out a transesterification reaction between ethylene glycol and dimethyl terephthalate to form a polyester prepolymer or carrying out a direct esterification reaction between ethylene glycol and terephthalic acid to form a polyester prepolymer and polycondensing the resulting polyester prepolymer in the presence of a catalytic compound selected from the group consisting of a manganite, manganate, and cobaltite of a Group I-A metal.

---

This invention relates to a method for the preparation of polyester resins. More particularly, it relates to a method of preparing highly polymeric linear polyesters which are particularly suitable for melt spinning into filaments through the use of an improved polycondensation catalyst.

Highly polymeric linear polyesters can be prepared from an ester of a dicarboxylic acid or a dicarboxylic acid by reacting such a material with a glycol. When an ester of a dicarboxylic acid is used, it is first reacted with a glycol in the presence of a transesterification catalyst by means of a transesterification or ester-interchange reaction. When a dicarboxylic acid is used as a starting material, it is subjected to a direct esterification reaction with a glycol in the presence of what is called a first stage catalytic additive or ether inhibitor. The resulting product of the first step of the transesterification method or first step of the direct esterification method may be described as a polyester prepolymer. This prepolymer is then polycondensed in the presence of a polycondensation catalyst to form the desired linear polyester resin.

In the transesterification method of preparing polyethylene terephthalate wherein ethylene glycol is reacted with dimethyl terephthalate, the first stage product of the transesterification reaction is comprised principally of bis-2-hydroxyethyl terephthalate. The first stage reaction product of the direct esterification reaction between ethylene glycol and terephthalic acid is comprised of bis-2-hydroxyethyl terephthalate and a substantial quantity of higher condensates of ethylene glycol and terephthalic acid. In particular, the product of the direct esterification reaction between ethylene glycol and terephthalic acid and the product of the transesterification reaction between dimethyl terephthalate and ethylene glycol can be described as bis-2-hydroxyethyl terephthalate or a polycondensation product thereof wherein the D.P. (degree of polymerization) varies from about 2 to about 6. However, for purposes of simplicity in describing the present invention, hereinafter the terms "polyester prepolymer" and "bis-2-hydroxyethyl terephthalate" will both denote and include within their scope the product of the direct esterification reaction between terephthalic acid and ethylene glycol and the product of the transesterification reaction between dimethyl terephthalate and ethylene glycol as set forth above.

From a commercial standpoint, it is essential that a polyester resin be produced in the shortest possible time and the desired degree of polymerization be obtained. A polyethylene terephthalate resin suitable for melt spinning should have a carboxyl content value of about or below 50 equivalents per million grams (eq./$10^6$ gr. or meq./kg.), a melting point of preferably at least about 258–260° C., and an intrinsic viscosity preferably not less than about 0.60 (determined in a 60% phenol and 40% tetrachloroethane solution, wt./wt., at 30° C.), in order for the filaments formed therefrom to possess a satisfactory level of hydrolytic stability, thermal stability, ultraviolet light stability and a high degree of tenacity which is necessary for use of such filaments in the manufacture of fibers such as are used in wash and wear clothing.

It is an object of the present invention to prepare a linear polyester resin by a direct esterification reaction between dicarboxylic acid and a diol or by a transesterification reaction between an ester of a dicarboxylic acid and a diol, so as to form a polyester prepolymer and then polycondense the resulting polyester prepolymer in the presence of a polycondensation catalyst.

It is another object of the present invention to prepare a polyester resin suitable for melt spinning into filaments by polycondensing bis-2-hydroxyethyl terephthalate in the presence of a polycondensation catalyst.

These and other objects are accomplished in accordance with the present invention which involves a method for preparing highly polymeric linear polyesters wherein dimethyl terephthalate is reacted with ethylene glycol in the presence of an ester-interchange catalyst to form a polyester prepolymer or where terephthalic acid is reacted with ethylene glycol in the presence of a first stage catalytic additive to form a polyester prepolymer and where the resulting polyester prepolymer is polycondensed in the presence of a polycondensation catalyst, the improvement comprising carrying out the polycondensation of the polyester prepolymer in the presence of a catalytic compound selected from the group consisting of a manganite, a manganate, and a cobaltite of a Group I-A metal of the Periodic Table (see Merck Index, sixth edition, inside front cover), in a sufficient concentration to catalyze the polycondensation reaction.

The polycondensation catalyst of the present method may be suitably varied within the limits defined above to meet any requirements of reaction conditions and desired product variation. For example, among the polycondensation catalysts that can be used in accordance with the present invention are lithium manganite, sodium manganate and lithium cobaltite, or any combination thereof.

The preparation of polyesters via the ester-interchange reaction is generally carried out with a molar ratio of glycol, such as ethylene glycol, to a dialkyl terephthalate, such as dimethyl terephthalate, of from about 1:1 to about 15:1, respectively, but preferably from about 1.2:1 to about 2.6:1. The transesterification reaction is generally carried out at atmospheric pressure in an inert atmosphere such as nitrogen, initially at a temperature range of from about 125° C. to about 250° C., but preferably between about 150° C. to 200° C. in the presence of a transesterification catalyst. During the first stage of this reaction, methyl alcohol is evolved and is continuously removed by distillation. After a reaction period of about 1 to 2 hours, the temperature of the reaction mixture is raised to from about 200° C. to about 300° C. for approximately one to three hours in order to complete the reaction, so as to form the desired polyester prepolymer and distill off any excess glycol.

Any known suitable transesterification or ester-interchange catalyst, for example, lithium hydride or zinc acetate, can be used to catalyze the present transesterification reaction. Generally, the transesterification catalyst is used in concentrations of from about 0.01% to about 0.20%, based on the weight of the dialkyl terephthalate used in the initial reaction mixture.

Similarly, the preparation of polyester resins via the direct esterification reaction is generally carried out with a molar ratio of glycol, such as ethylene glycol, to a dicarboxylic acid, such as terephthalic acid, of from about 1:1 to about 15:1, but preferably from about 1.2:1 to about 2.6:1. The direct esterification step is generally carried out at temperatures ranging from about 180° C. to about 280° C. in the absence of an oxygen containing atmosphere at atmospheric or elevated pressure for about two to four hours to form the desired polyester prepolymer. For example, the reaction may be carried out in an atmosphere of nitrogen.

Any known suitable first stage direct esterification catalytic additive may be used in the direct esterification step of the present method. For example, calcium acetate or triethylamine may be used. The first stage catalytic additives are generally used in concentrations ranging from $5\times10^{-5}$ mole to about $5\times10^{-1}$ mole of catalytic additive per mole of terephthalic acid present in the initial terephthalic acid-glycol reaction mixture.

The polycondensation step of the present invention is accomplished by adding a manganite, manganate, or cobaltite compround as defined above to a polyester prepolymer or bis-2-hydroxyethyl terephthalate and heating the blend thereof under reduced pressure within the range of from about 0.05 mm. to 20 mm. of mercury while being agitated at a temperature of from about 260° C. to about 325° C. for from two to four hours. In accordance with the present invention, the subject polycondensation catalysts are employed in amounts ranging from about 0.01% to about 0.2%, based on the weight of the polyester prepolymer to be polycondensed. Usually, it has been found that from about 0.02% to about 0.1% of a subject polycondensation catalyst is preferred in most instances. Higher or lower concentrations of the present polycondensation catalysts can also be used in the subject polycondensation reaction. However, when concentrations less than the above are used, the effectiveness is generally reduced, whereas if concentrations greater than this are used, no further improvement in the present method or desired product is generally obtained.

The following examples of several preferred embodiments will further serve to illustrate the present invention. All parts are by weight unless otherwise indicated.

EXAMPLE I

A blended mixture comprising 474 g. of terephthalic acid, 288 mls. of ethylene glycol and 149 mls. of triethylamine was charged into a reaction vessel equipped with a nitrogen inlet, a Dean-Starke separating apparatus, heating means, and stirring means. The reaction mixture was agitated and the temperature was raised to about 197/ C. under a nitrogen blanket at atmospheric pressure. At about 190° C., a water-triethylamine azeotropic mixture started to distill off. The azeotropic mixture was continuously separated by means of the Dean-Starke apparatus, and the triethylamine recovered was continuously returned to the reaction vessel. The reaction mixture became almost clear. Then, the temperature was allowed to rise to about 220° C. over a one hour period to form a polyester prepolymer. The prepolymer product was allowed to cool under an atmosphere of nitrogen.

EXAMPLE II

Fifty grams of the prepolymer product of Example I was combined with 0.02 g. of lithium manganite and placed in a reaction vessel. The reaction mixture was heated at about 280° C. under reduced pressure of from about 0.05 to about 0.1 mm. of mercury while under agitation for about two hours to bring about the polycondensation of the prepolymer and formation of a polyester resin. The plyester resin product formed had an intrinsic viscosity of 0.62, a melting point of about 262° C., and a carboxyle content value of 15.8 (meq./kg.).

EXAMPLE III

Fifty grams of the prepolymer product of Example I was combined with 0.02 g. of lithium cobaltite and placed in a reaction vessel. The reaction mixture was heated at about 280° C. under reduced pressure of from about 0.05 to about 0.1 mm. of mercury while under agitation for about three hours to bring about the polycondensation of the prepolymer and formation of a polyester resin. The polyester resin product obtained has an intrinsic viscosity of 0.68, a melting point of about 259° C., and a carboxyl content value of 20.0 (meq./kg.).

EXAMPLE IV

A mixture comprising 600 grams of dimethyl terephthalate, 396 mls. of ethylene glycol and 0.24 gram of lithium hydride was charged into a reaction vessel equipped with a nitrogen inlet, heating means and stirring means. The reaction mixture was agitated and heated at atmospheric pressure at 198° C. under a nitrogen blanket. The reaction mixture was held at about 198° C. for about two hours, during which time by-product methyl alcohol was distilled off. Then the temperature of the reaction mixture was allowed to rise to 230° C. over a period of about one hour to distill off any remaining by-product methyl alcohol and ethylene glycol and form a polyester prepolymer. The prepolymer product was allowed to cool under an atmosphere of nitrogen.

EXAMPLE V

Fifty grams of the prepolymer product of Example IV was mixed with 0.02 g. of lithium manganite and placed in a reaction vessel. The reaction mixture was heated to about 280° C. under reduced pressure of about from 0.05 to about 0.1 mm. of mercury while under agitation for about three hours to bring about the polycondensation of the polyester prepolymer and formation of the polyester resin. The resulting resin product had an intrinsic viscosity of 0.73, a melting point of about 267° C. and a carboxyl content value of 14.7 (meq./kg.).

EXAMPLE VI

Fifty grams of the prepolymer product of Example IV was mixed with 0.20 g. of sodium manganate and placed in a reaction vessel. The reaction mixture was heated to about 280° C. under reduced pressure of about from 0.05 to about 0.1 mm. of mercury while under agitation for about three hours to bring about the polycondensation of the polyester prepolymer and formation of the polyester resin. The resulting polyester resin product had an intrinsic viscosity of 0.60, a melting point of about 260° C., and a carboxyl content value of 5.9 (meq./kg.).

The intrinsic viscosities of the polyester resin products of the above examples were measured in a 60% phenol and 40% tetrachloroethane solution (wt./wt.) at 30° C.

The process of the present invention has been described with particular reference to polyethylene terephthalate, but it will be obvious that the subject invention includes within its scope other polymeric polymethylene terephthalates formed from glycols of the series

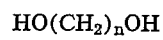

$$HO(CH_2)_nOH$$

where $n$ is 2 to 10 and terephthalic acid or esters thereof and copolyesters containing varied amounts of other suitable dicarboxylic acids or esters thereof, such as isophthalic acid.

The polyester resin products obtained in the above examples had high molecular weights, as indicated by their intrinsic viscosities, high melting points and sufficiently low carboxyl content values so as to make them suitable for use in preparing polyester filaments.

We claim:
1. In a process of preparing polyethylene terephthalate resin wherein dimethyl terephthalate is reacted with ethylene glycol in the presence of an ester-interchange catalyst to form a polyester prepolymer or where terephthalic acid is reacted with ethylene glycol in the presence of a first stage catalytic additive to form a polyester prepolymer and where the resulting polyester prepolymer is polycondensed in the presence of a polycondensation catalyst, the improvement comprising carrying out the polycondensation of the polyester prepolymer in the presence of a polycondensation catalyst selected from the group consisting of a manganite, a manganate, and a cobaltite of a Group I-A metal of the Periodic Table (Merck index, sixth edition) in a sufficient concentration to catalyze the polycondensation reaction.

2. The process of claim 1 wherein a catalytic compound is present in an amount of from about 0.01% to about 0.2%, based on the weight of the polyester prepolymer.

3. The process of claim 1 wherein the catalytic compound is lithium manganite.

4. The process of claim 1 wherein the catalytic compound is sodium manganate.

5. The process of claim 1 wherein the catalytic compound is lithium cobaltite.

References Cited

UNITED STATES PATENTS 2,951,060   8/1960   Billica _____ 260—75
3,073,801   1/1963   Siggel et al. _____ 260—75

WILLIAM H. SHORT, Primary Examiner

LOUISE P. QUAST, Assistant Examiner

U.S. Cl. X.R.

260—475